United States Patent [19]

Pilz et al.

[11] 4,338,552
[45] Jul. 6, 1982

[54] AUTOMATIC CONTROL SYSTEM FOR D-C MOTOR

[75] Inventors: Karl-Heinz Pilz, Baltmannsweiler; Wolfgang Gräter, Stuttgart; Hans-Dietrich Mayer, Baltmannsweiler, all of Fed. Rep. of Germany

[73] Assignee: Richard Hirschmann, Radiotechnisches Werk, Esslingen, Fed. Rep. of Germany

[21] Appl. No.: 154,092

[22] Filed: May 28, 1980

[30] Foreign Application Priority Data

May 31, 1979 [DE] Fed. Rep. of Germany ....... 2922197

[51] Int. Cl.³ ............................................. H02P 1/22
[52] U.S. Cl. .................................. 318/266; 318/284; 318/286; 318/366
[58] Field of Search ............... 318/309, 280, 430, 436, 318/446, 459, 266, 267, 466, 468, 479, 284, 286, 366, 369, 374, 282, 444; 307/10 R; 343/901, 883, 880, 878, 877, 714, 711

[56] References Cited

U.S. PATENT DOCUMENTS

| | | | |
|---|---|---|---|
| 2,989,678 | 6/1961 | Swartout | 318/309 X |
| 3,143,696 | 8/1964 | Harris | 318/266 |
| 3,209,225 | 9/1965 | Choudhury | 318/369 X |
| 3,262,041 | 7/1966 | Wickenhagen | 318/369 |
| 3,735,224 | 5/1973 | Bachofer et al. | 318/284 |
| 3,980,934 | 9/1976 | Wright | 318/284 X |
| 4,190,841 | 2/1980 | Harada | 343/901 X |
| 4,207,503 | 6/1980 | Irschik et al. | 318/459 X |

*Primary Examiner*—Ulysses Weldon
*Attorney, Agent, or Firm*—Karl F. Ross

[57] ABSTRACT

A reversible d-c motor, driving a load such as a vehicular radio antenna, has its armature winding connected in a transistorized energizing circuit which is activated by a start circuit and locks operated as long as the motor speed surpasses a certain threshold, i.e. until a major obstacle or a terminal position is encountered. The threshold may be determined by a voltage sensor detecting the counter-e.m.f. induced in the armature winding, by a Hall-effect device in the magnetic field of the stator, or by a speed sensor. The armature winding lies in series with a current limiter which determines the maximum torque applied to the load and may also transmit a no-load signal to a protective circuit when the motor is found idling, the protective circuit including a timer which cuts off the motor after a predetermined idling period. Alternatively, the operating period may be determined by a pulse counter de-energizing the motor after a preferably settable number of rotor revolutions.

7 Claims, 5 Drawing Figures

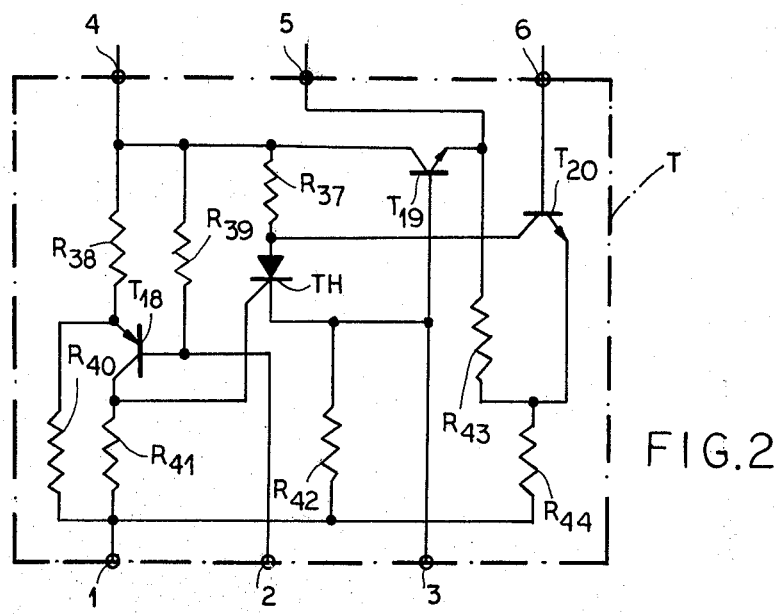
FIG.2
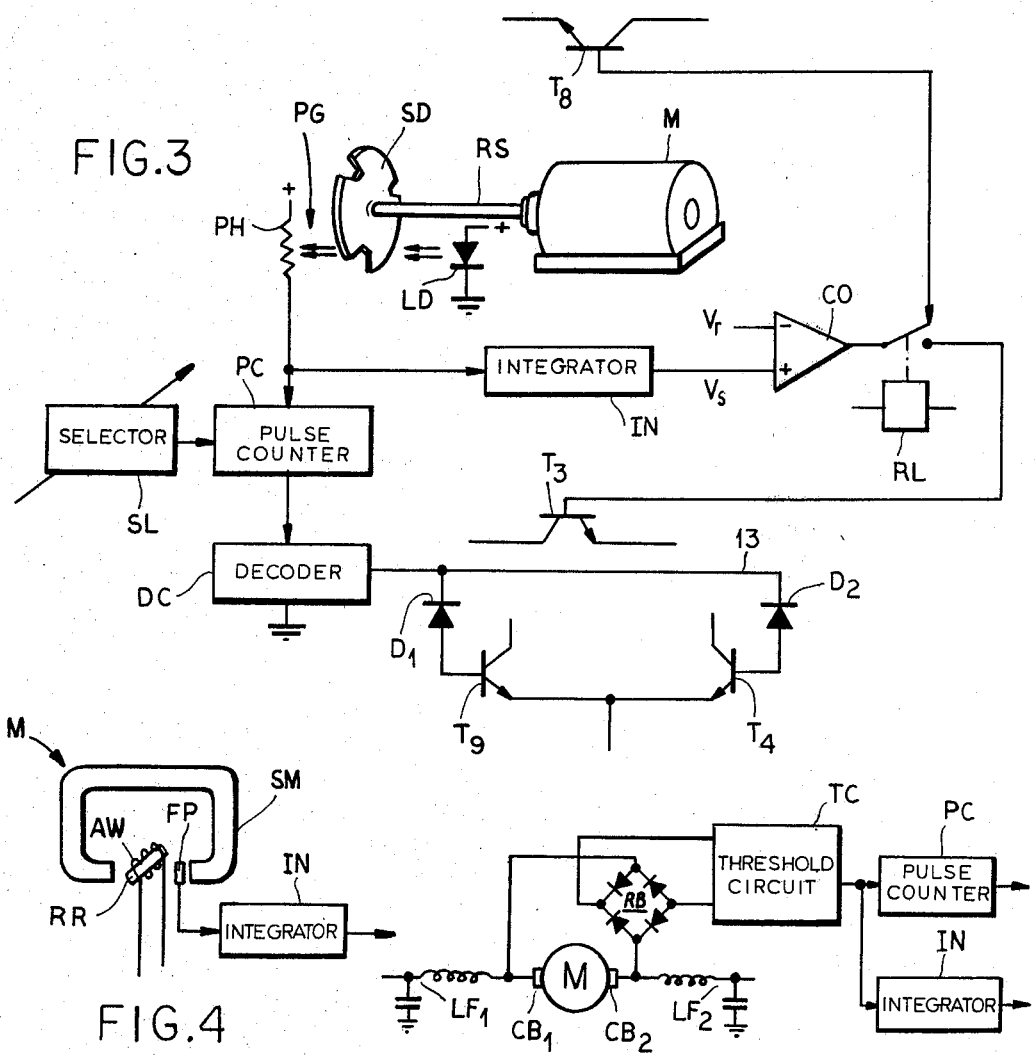
FIG.3
FIG.4
FIG.5

AUTOMATIC CONTROL SYSTEM FOR D-C MOTOR

FIELD OF THE INVENTION

Our present invention relates to a system for automatically controlling the operation of a direct-current motor, preferably one of the reversible kind, is to be drivingly connected to a load for displacing same over a limited distance. Representative of the loads here contemplated are installations aboard automotive vehicles, such as retractable radio antennas, sliding roofs or windows, which are to be driven by the vehicular battery.

BACKGROUND OF THE INVENTION

Since devices of this type cannot be moved beyond a certain terminal position, the associated d-c motor tends to become overloaded and must therefore be protected against excessive current flow in its armature winding which would not only drain the vehicular battery but also cause overheating with possible destructive effects. Conventional protective systems used for this purpose can be divided into two groups, namely those operating mechanically to cut off the motor in response to a physical obstacle encountered by the load and those using the armature current as a cut-off criterion.

Typical overload-protection systems of the first group, comprising spring-loaded disconnect switches, are described in commonly owned German Pat. No. 1,079,133 and German published specification No. 25 12 791. Also included in this group are systems using a slipping clutch, e.g. as described in commonly owned German utility model No. 7,125,992.

A protective system of the second group, described in commonly owned German published specification No. 2 001 745, comprises a resistor in series with the armature winding and means for de-energizing this winding upon detecting an excessive voltage drop across the series resistor due to a stoppage of the load (i.e. a telescoping radio antenna) in a terminal position. This system also includes a delay circuit designed to prevent premature de-energization during start-up when the armature winding draws a large current.

An electronically operating motor-control system of the kind last described avoids the disadvantages of bulk, wear and lack of convenient adjustability inherent in protective systems of the first group, yet the need for letting the armature current rise—albeit for a brief period—above a normally admissible limit is still a drawback, requiring the rotor and its winding to be designed in an uneconomical manner for larger loads than would basically be necessary

OBJECTS OF THE INVENTION

An object of our present invention, therefore, is to provide an improved motor-control system of the electronically operated type which automatically de-energizes a d-c motor, without reliance on an excessive current flow, whenever the entrained load arrives in a terminal position or encounters a major obstacle.

Another object is to provide means in such a system for limiting the length of time during which such a motor can run idle when somehow detached from its load and therefore not subject to positional de-energization.

SUMMARY OF THE INVENTION

Our improved system for automatically controlling a d-c motor, whose rotor carries an armature winding in a magnetic stator field, comprises electronic switch means activable by a start circuit to close an energizing circuit connecting the armature winding across a supply of direct current, this energizing circuit including current-limiting means designed to prevent the development of an excessive torque in a terminal load position or in the presence of an obstacle. We further provide sensing means operatively coupled to the armature winding but independent of the aforementioned current-limiting means for detecting the motor speed and opening the energizing circuit when that speed drops below a predetermined threshold, the start circuit being effective to override the sensing means in an initial operating phase.

The current-limiting means may comprise, pursuant to a more particular feature of our invention, a pair of cross-coupled transistor stages and a feedback resistor, the latter being in series with one of the transistor stages and with the armature winding. In the case of a reversible motor, its energizing circuit is divided into two branches adapted to drive it in one or the other direction, the pair of transistor stages being duplicated in these branches while the feedback resistor is common to both branches.

Though a variety of sensing means independent of the current-limiting circuitry could be used to de-energize the motor when its speed approaches or reaches zero, we prefer to employ one or two voltage dividers connected across the armature winding together with electronic holding means having input circuitry connected across part of the voltage divider or dividers for maintaining one or the other circuit branch operated in response to a predetermined voltage drop of a respective polarity. The voltage drop thus measured, determined in large part by the counter-e.m.f. induced in the rotating armature winding by the stator field, drops to a low value when the rotor approaches standstill even though the current flow through the winding at that stage has the maximum magnitude determined by the current-limiting means.

Another advantageous feature of our invention resides in the provision of timing means triggerable by the start circuit to measure a maximum idling period for the motor, the timing means being deactivated by disabling means controlled by the aforementioned feedback resistor during flow of a predetermined minimum armature current indicative of a no-load condition. In lieu of such timing means, however, we may provide means such as a pulse counter for measuring a predetermined number of motor revolutions before cutting off the current supply.

BRIEF DESCRIPTION OF THE DRAWING

The above and other features of our present invention will now be described in detail with reference to the accompanying drawing in which:

FIG. 2 shows details of a timer included in the circuitry of FIG. 1;

FIG. 3 shows a partial modification of the circuitry of FIG. 1; and

FIGS. 4 and 5 illustrate other partial modifications.

SPECIFIC DESCRIPTION

Figure 1:
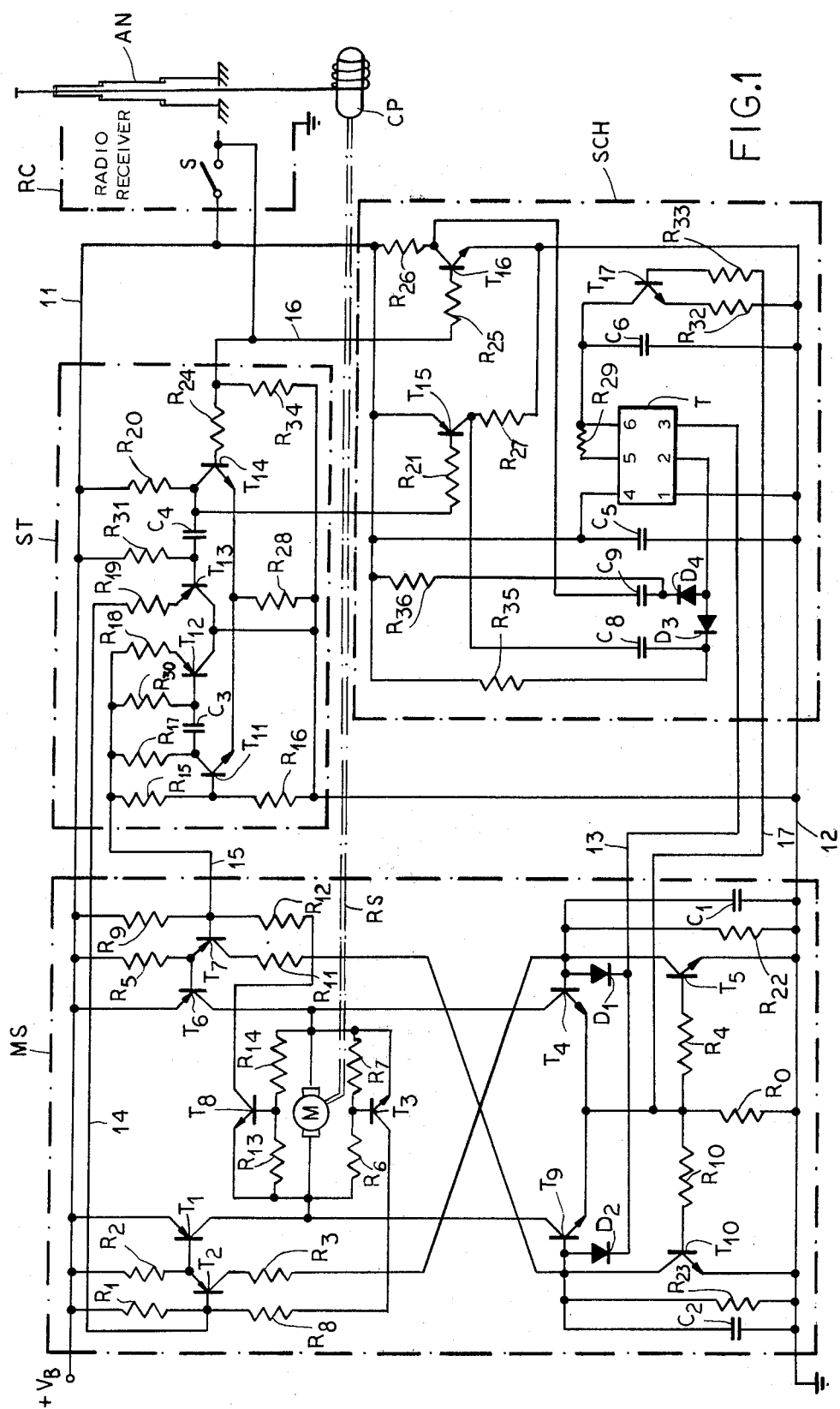
FIG. 1 is a circuit diagram of a motor-control system embodying our invention.

In FIG. 1 we have shown a reversible d-c motor M whose rotor RR (see FIG. 4) has a shaft RS connected to a load here represented by a telescoping vehicular antenna AN which can be extended and retracted by a Bowden wire wound on a capstan CP. The vehicle is provided with a battery whose positive terminal delivers a voltage $+V_B$ to a bus 11; its negative terminal is connected to a conductor 12 which may be grounded, as indicated. A radio receiver RC associated with antenna AN is connectable to bus 11 by a manual switch S.

The motor-control system shown in FIG. 1 is divided into an energizing circuit MS, a start circuit ST and a protective circuit SCH, the latter including a timer T with terminals 1-6. Input terminals 1 and 4 of the timer, bridged by a capacitor $C_5$ designed to absorb transients due to the cut-in or cutoff of other loads, are respectively connected to ground at conductor 12 and to positive potential on bus 11.

Energizing circuit MS is divided into two symmetrical branches, i.e. a first branch with PNP power and pilot transistors $T_1$, $T_2$ and NPN holding, current-limiting and feedback transistors $T_3$–$T_5$ and a second branch with PNP power and pilot transistors $T_6$, $T_7$ and NPN holding, current-limiting and feedback transistors $T_8$–$T_{10}$. The emitters of current-limiting transistors $T_4$ and $T_9$ are grounded through a common feedback resistor $R_0$, their collectors being respectively connected to those of power transistors $T_6$ and $T_1$ whose emitters are tied to bus 11. Pilot transistors $T_2$ and $T_7$ have their emitters respectively connected to the bases of the associated power transistors and further connected to bus 11 via respective resistors $R_2$ and $R_5$. The collector of holding transistor $T_3$ is connected to bus 11 via a voltage divider consisting of resistors $R_1$ and $R_8$ whose junction is tied to the base of pilot transistor $T_2$. Similarly, the collector of holding transistor $T_8$ is connected to bus 11 via a voltage divider consisting of resistors $R_9$ and $R_{12}$ whose junction is tied to the base of pilot transistor $T_7$. A resistor $R_3$ lies between the collectors of transistors $T_2$ and $T_5$, the latter having a grounded emitter and a base connected via a resistor $R_4$ to the emitter junction of transistors $T_4$ and $T_9$. Similarly, a resistor $R_{11}$ lies between the collectors of transistors $T_7$ and $T_{10}$, the latter also having a grounded emitter and having its base connected to the aforementioned emitter junction (and thus to the ungrounded terminal of feedback resistor $R_0$) by way of a resistor $R_{10}$. The bases of current-limiting transistors $T_4$ and $T_9$ are connected to ground, on the one hand, via respective capacitors $C_1$, $C_2$ and, on the other hand, via respective resistors $R_{22}$, $R_{23}$. These bases are further connected, via respective diodes $D_1$ and $D_2$, to a lead 13 extending to terminal 3 of timer T.

The armature winding AW of motor M (see FIG. 4) is inserted between the collectors of transistors $T_1$ and $T_6$ (and thus also between those of transistors $T_4$ and $T_9$) in parallel with two voltage dividers respectively consisting of resistors $R_6$, $R_7$ and $R_{13}$, $R_{14}$. The junction of resistors $R_6$ and $R_7$ is tied to the base of holding transistor $T_3$ whose emitter is connected to the opposite terminal of resistor $R_7$. In an analogous manner, the junction of resistors $R_{13}$ and $R_{14}$ is tied to the base of holding transistor $T_8$ whose emitter is connected to the opposite terminal of resistor $R_{13}$.

Two leads 14 and 15 extend from the bases of pilot transistors $T_2$ and $T_7$ to start circuit ST. This start circuit is also divided into two substantially symmetrical halves respectively including complementary switching and ancillary transistors $T_{11}$, $T_{12}$ and $T_{13}$, $T_{14}$, the collectors of NPN switching transistors $T_{11}$ and $T_{14}$ being coupled to the bases of PNP ancillary transistors $T_{12}$ and $T_{13}$ via respective capacitors $C_3$ and $C_4$. The base of transistor $T_{11}$ is biased at a substantially constant potential by a voltage divider comprising the resistor $R_9$ of energizing circuit MS and two further resistors $R_{15}$ and $R_{16}$ serially inserted between lead 15 and conductor 12; lead 15 is further connected through respective resistors $R_{17}$, $R_{18}$ and $R_{30}$ to the collector of transistor $T_{11}$, to the emitter of transistor $T_{12}$ and to the base of the latter transistor. Transistor $T_{13}$, whose emitter is connected to lead 14 via a resistor $R_{19}$, has its base connected through a resistor $R_{31}$ to bus 11 which is also connected by way of a resistor $R_{20}$ to the collector of transistor $T_{14}$. Switching transistors $T_{11}$ and $T_{14}$ constitute respective stages of a voltage comparator by having their emitters grounded through a common lockout resistor $R_{28}$. Grounded conductor 12 is also directly connected to the collectors of ancillary transistors $T_{12}$ and $T_{13}$ while being further connected to the base of switching transistor $T_{14}$ via two resistors $R_{24}$ and $R_{34}$ whose junction is tied to a lead 16 which is energized from bus 11 upon closure of switch S.

Protective circuit SCH comprises a PNP transistor $T_{15}$ and two NPN transistors $T_{16}$ and $T_{17}$ along with several storage capacitors $C_6$, $C_8$ and $C_9$ besides the aforedescribed smoothing capacitor $C_5$. Transistor $T_{15}$, whose base is connected to the collector of transistor $T_{14}$ via a resistor $R_{21}$, has its emitter tied directly to bus 11 and its collector grounded through a resistor $R_{27}$. Transistor $T_{16}$, conversely, has a grounded emitter and a collector connected to bus 11 through a resistor $R_{26}$, its base being tied to lead 16 via a resistor $R_{25}$. Transistor $T_{17}$, serving to disable the timer T during normal operation of motor M, has its emitter grounded through a resistor $R_{32}$ and is connected together with that resistor across capacitor $C_6$ whose ungrounded plate is connected, together with the collector of this transistor, to timer terminal 6 which is linked with terminal 5 via a charging resistor $R_{29}$. The base of transistor $T_{17}$ is connected by way of a resistor $R_{33}$ to a lead 17 which extends to the junction of resistors $R_0$, $R_4$, $R_{10}$ with the emitters of current-limiting transistors $T_4$ and $T_9$ in energizing circuit MS. Capacitor $C_8$ has one plate tied to the collector of transistor $T_{15}$, its other plate being connected to bus 11 through a resistor $R_{35}$ and to timer terminal 2 via a diode $D_3$. Capacitor $C_9$, similarly, has one plate tied to the collector of transistor $T_{16}$, its other plate being connected to bus 11 through a resistor $R_{36}$ and to terminal 2 via a diode $D_4$.

Timer T of FIG. 1 may have the construction illustrated in FIG. 2, including an electronic relay in the form of a thyristor TH whose anode is connected through a resistor $R_{37}$ to positive voltage on input terminal 4. A PNP triggering transistor $T_{18}$ has its emitter and its base connected to input terminal 4 via respective resistors $R_{38}$ and $R_{39}$, that base being also tied to output terminal 2; the emitter and the collector of transistor $T_{18}$ are grounded by way of respective resistors $R_{40}$ and $R_{41}$, the collector being also tied to the gate of thyristor TH. A resistor $R_{42}$ grounds the cathode of the thyristor which is furthermore connected to output terminal 3 and to the base of an NPN transistor $T_{19}$ having its collector and emitter respectively tied to terminals 4 and 5. An NPN quenching transistor $T_{20}$ has its collector tied to the anode of thyristor TH, its base joined to terminal 6 and its emitter connected to the junction of two resistors $R_{43}$, $R_{44}$ serially inserted between terminals 1 and 5. Under steady-state conditions, and with thyristor TH cut off, transistors $T_{19}$ and $T_{20}$ are also nonconducting and terminals 3, 5, 6 are at ground potential while terminal 2 is at voltage level $+V_B$.

Another type of timer which could be used in lieu of the circuitry of FIG. 2 is a module shown on page 243 of a handbook entitled "Valvo Data Manual", published 1977 by Signetics Corp. of Sunnyvale, Calif.

Operation

In the quiescent state, with switch S open and radio receiver RC thus disconnected from the power supply, only transistor $T_{11}$ is conductive. Current-limiting transistors $T_4$ and $T_9$ are cut off since their bases are connected via diodes $D_1$ and $D_2$ to the ground on lead 13. Capacitor $C_8$ is charged while capacitor $C_9$, with both plates connected to potential $+V_B$, is discharged.

Closure of switch S then saturates the transistor $T_{14}$ with consequent cutoff of transistor $T_{11}$ and conduction of transistors $T_{15}$ and $T_{16}$ whereby capacitor $C_8$ is discharged and capacitor $C_9$ is charged. Via diode $D_4$, capacitor $C_9$ transmits a negative pulse to terminal 2 and thus to the base of triggering transistor $T_{18}$ (FIG. 2) which thereupon conducts long enough to fire the thyristor TH. This turns on the transistor $T_{19}$ and also removes the negative bias from lead 13, thereby unblocking the transistors $T_4$ and $T_9$. As terminal 5 goes positive, a charging current begins to flow into capacitor $C_6$ which together with resistor $R_{29}$ forms an R/C network with a time constant of about 20 seconds, more than enough to extend the antenna AN of receiver RC.

A negative pulse is also transmitted via capacitor $C_4$, upon the saturation of switching transistor $T_{14}$, to the base of transistor $T_{13}$ which thereupon conducts and, via lead 14, drives the base of pilot transistor $T_2$ negative, thus turning on the latter transistor which quickly charges the capacitor $C_1$ and biases the transistor $T_4$ into conduction. With power transistor $T_1$ also opened up by transistor $T_2$, current can now pass from bus 11 through the armature winding of motor M by way of the forward-driving branch of circuit MS, including transistors $T_1$ and $T_4$, as well as through feedback resistor $R_0$ to ground conductor 12. The R/C network of start circuit ST constituted by capacitor $C_4$ and resistors $R_{28}$, $R_{31}$ has a sufficiently large time constant to allow the associated holding transistor $T_3$ to become eventually conductive as a result of the voltage drop developed across voltage divider $R_6$, $R_7$ which is determined by the combined magnitude of the resistance of the armature winding, the counter-e.m.f. induced in that winding by the stator field (which could be generated by a permanent magnet or by an electromagnetic coil) and the contact resistance of the commutator brushes in series therewith. Conduction of transistor $T_3$ maintains, via resistor $R_8$, a negative bias on the base of pilot transistor $T_2$ so that the motor M remains energized even after the cut-in pulse from capacitor $C_4$ has decayed. Thanks to the high input resistance of transistor $T_{13}$, operating in the common-collector mode, this capacitor can be relatively small.

The voltage drop developed by the armature current across feedback resistor $R_0$ is sensed by transistor $T_5$ which becomes limitedly conductive and, by lowering the base voltage of transistor $T_4$ cross-coupled therewith, throttles the flow of that current which is thereby stabilized at a predetermined maximum value during the initial phase of operation. This value is so low that the potential difference across the divider $R_6$, $R_7$ will not turn on the holding transistor $T_3$ until the motor has reached a certain minimum speed giving rise to a significant counter-e.m.f. The moderate torque available from the limited current flow does not lead to a substantial increase in motor speed as long as rotor shaft RS remains operatively coupled to the load. Under these circumstances, the ungrounded end of resistor $R_0$ connected to lead 17 stays sufficiently positive to saturate the disabling transistor $T_{17}$ shunting the capacitor $C_6$ of protective circuit SCH so that this capacitor does not charge and the 20-second period measured by timer T does not start running. If, however, motor M were started with antenna AN removed for replacement purposes, for example, or with a break in the Bowden cable linking the antenna with capstan CP, the motor would idle at high speed on a greatly diminished armature current substantially cutting off the shunting transistor $T_{17}$ so that protective circuit SCH becomes effective at the end of that charging period. With terminal 6 now biased sufficiently positive, quenching transistor $T_{20}$ (FIG. 2) conducts and extinguishes the thyristor TH, thereby also cutting off the transistor $T_{19}$ whereupon capacitor $C_6$ begins to discharge via resistors $R_{43}$ and $R_{44}$. Terminal 3 goes again to ground potential and, via lead 13 and diodes $D_1$, $D_2$, reblocks the transistor $T_4$ (along with its inactive mate $T_9$) to terminate the energization of motor M.

If the motor M operates normally and reaches the terminal position of its forward stroke, i.e. fully extends the antenna AN, its shaft RS is arrested so that the counter-e.m.f. induced in its armature winding disappears. This deactivates the holding transistor $T_3$ and with it the pilot and power stages $T_2$, $T_1$ whereby the motor is promptly de-energized: A like de-energization would occur if the motor were stalled prematurely by some obstacle in the path of its load.

The disappearance of the induced counter-e.m.f. upon the halting of the forward drive gives rise to a transient voltage across resistors $R_{13}$, $R_{14}$ which could turn on the transistor $T_8$ along with transistors $T_7$, $T_6$ and $T_9$ so as to start the motor in the reverse direction. Capacitor $C_2$, however, bypasses the current pulse of transistor $T_7$ to ground and thus prevents the conduction of transistors $T_9$ and $T_{10}$. Capacitor $C_1$ plays an analogous role upon the halting of the motor in reverse drive.

When the user reopens the switch S, transistors $T_{14}$, $T_{15}$ and $T_{16}$ are cut off to restore the initial state of charge of capacitors $C_8$ and $C_9$. The charging of capacitor $C_8$ again drives the terminal 2 and, with it, the base of transistor $T_{18}$ negative with reference to its emitter so that thyristor TH is fired and the timer T is activated as before. Switching transistor $T_{11}$, saturated by the cutoff of transistor $T_{14}$, sends a negative pulse via capacitor $C_3$ to the base of pilot transistor $T_7$ to enable the associated power transistor $T_6$ along with current-limiting transistor $T_9$. Motor M is thus operated in reverse by the second half of circuit MS, including transistors $T_6$ and $T_9$, the armature current passing again through feedback resistor $R_0$ controlling the flow-limiting action of transistors $T_9$ and $T_{10}$. This operation is perfectly analogous to that described for the forward drive, with holding transistor $T_8$ coming into play as soon as the motor has gathered enough speed to generate a significant counter-e.m.f. whereby pilot transistor $T_7$ is maintained conductive via resistor $R_{12}$ after the cut-in pulse from capacitor $C_3$ has decayed. De-energization occurs, as before, when the motor is installed in the terminal position of the return stroke (antenna AN fully retracted) or, possibly, in the presence of an obstacle which cannot be surmounted by the limited motor torque. Protective circuit SCH comes into play, again, if the motor should idle for longer than the preset timing period of 20 seconds.

The interconnection of transistors $T_{11}$ and $T_{14}$ through lockout resistor $R_{28}$ ensures a rapid switchover between forward and reverse drive even when, owing to the presence of capacitances connected to lead 16 within receiver RC, the base voltage of transistor $T_{11}$ changes only gradually upon the opening or closure of switch S. Such a quick switchover is needed to generate the cut-in pulse on lead 14 or 15 which initiates the forward or reverse drive.

In lieu of the voltage dividers $R_6$, $R_7$ and $R_{13}$, $R_{14}$ shown in FIG. 1, other means independent of the current-limiting circuitry $T_4$, $T_5$, $T_9$, $T_{10}$ could be used for controlling the holding transistors $T_3$ and $T_8$ in response to the motor speed. Thus, FIG. 3 shows a photoelectric speed sensor comprising a slotted disk SD mounted on rotor shaft RS, this disk lying in a ray path between a light-emitting diode LD and a photoresistor PH delivering a fixed number of voltage pulses per revolution to an integrator IN and to a counter PC. The number of light pulses striking the photoresistor PH in a given unit of time is proportional to the motor speed and is converted by integrator IN into an electrical signal $V_s$ fed together with a reference voltage $V_r$ to a comparator CO. When the motor reaches its predetermined minimum speed, signal $V_s$ surpasses the reference voltage $V_r$ whereupon comparator CO biases one or the other holding transistor $T_3$, $T_8$ into conduction according to the energized or de-energized state of a relay RL. This relay is controlled, in a manner not specifically illustrated, by the switch S of FIG. 1 and may also be used for the selective energization of switching transistors $T_{11}$ and $T_{14}$ in lieu of the direct connection shown in FIG. 1. Relay RL could, of course, be of the electromagnetic or the electronic type.

Pulse counter PC measures the travel of the load by counting the number of shaft revolutions. With the aid of a manual selector SL, counter PC can be set to zero or otherwise preloaded to vary the number of pulses counted and with it the extent of the load travel. Thus, the user may decide to extend the antenna AN only partially, on driving through an area of strong radio signals, by de-energizing the motor M before its automatic cutoff in the terminal position of the load. The full count of pulse counter PC is detected by a decoder DC which thereupon grounds the lead 13 to block the transistors $T_4$ and $T_9$ via diodes $D_1$ and $D_2$. The protective circuit SCH of FIG. 1 will not be needed in this case since the motor M will be invariably arrested after a maximum number of revolutions determined by the capacity of the counter.

Selector SL, allowing the user to stop the motor in any desired intermediate position, is also useful with loads other than radio antennas, e.g. windows or a sliding roof of an automotive vehicle. If such adjustability is not required, as where the antenna AN is to be either fully extended or fully retracted, counter PC may be reset by a cut-in pulse from lead 14 or 15 (FIG. 1) generated upon any reversal of switch S.

In FIG. 4 we have illustrated the possibility of using yet another type of substantially current-independent speed-sensing means for de-energizing the motor M when its speed drops below a predetermined limit. A Hall-effect device, designed as a field plate FP, is here inserted in the air gap between a stator magnet SM and the rotor RR bearing armature winding AW. The variations in magnetic flux sensed by the field plate FP are translated into voltage pulses fed to integrator IN which controls the holding transistors $T_3$ and $T_8$ in the manner described with reference to FIG. 3. Here, too, the electrical pulses could be further fed to a counter for the purpose of preselecting a load position and/or establishing a maximum idling period as discussed above.

Still another tachometric device has been shown in FIG. 5 where commutator brushes $CB_1$ and $CB_2$ in series with the armature winding of motor M, separated from the remainder of its energizing circuit by respective low-pass filters $LF_1$ and $LF_2$, are connected across the input diagonal of a rectifier bridge RB whose output diagonal is connected across a threshold circuit TC. The latter, upon detecting a significant voltage difference between the two brushes, steps the pulse counter PC in parallel with integrator IN which operate as in FIG. 3.

The electronic components of the control system, in particular those of the current-limiting circuitry including cross-coupled transistor stages $T_4$, $T_5$ and $T_9$, $T_{10}$ as well as diodes $D_1$, $D_2$, can be realized in integrated form and can be safely encased for protection against dust and atmospheric influences.

We claim:

1. A system for automatically controlling the operation of a direct-current motor having an armature winding in a magnetic stator field on a rotor adapted to be drivingly coupled to a load, comprising:
    a supply of direct current;
    manually operable start means;
    electronic switch means activable by said start means to close an energizing circuit connecting said armature winding across said supply;
    current-limiting means in said energizing circuit including an impedance element in series with said armature winding;
    sensing means independent of said current-limiting means operatively coupled to said rotor for detecting the motor speed and opening said energizing circuit upon said motor speed dropping below a predetermined threshold, said start means being effective to override said sensing means in an initial operating phase;
    timing means triggerable by said start means to measure a maximum idling period for said motor; and
    disabling means controlled by said impedance element for deactivating said timing means during flow of a predetermined minimum armature current.

2. A system for automatically controlling the operation of a direct-current motor having an armature winding in a magnetic stator field on a rotor adapted to be drivingly coupled to a load, comprising:
    a supply of direct current;
    manually operable start means;
    electronic switch means activable by said start means to close an energizing circuit connecting said armature winding across said supply;

current-limiting means in said energizing circuit including a pair of cross-coupled transistor stages and a feedback resistor in series with one of said transistor stages and with said armature winding; and sensing means independent of said current-limiting means operatively coupled to said rotor for detecting the motor speed and opening said energizing circuit upon said motor speed dropping below a predetermined threshold, said start means being effective to override said sensing means in an initial operating phase.

3. A system as defined in claim 1 wherein said motor is reversible, said energizing circuit being divided into two branches for driving said motor in respective directions, said pair of transistor stages being one of two substantially identical pairs respectively included in said branches, said feedback resistor being common to both said branches.

4. A system as defined in claim 3 wherein said start means comprises a first transistor in series with a first R/C network operable by closure of a manual switch to emit a cut-in pulse for one of said branches and a second transistor in series with a second R/C network responsive to a reopening of said manual switch to emit a cut-in pulse for the other of said branches.

5. A system as defined in claim 4 wherein said first and second transistors are interconnected in a comparator circuit for mutual lockout.

6. A system as defined in claim 1, 3, 4 or 5, further comprising timing means triggerable by said start means to measure a maximum idling period for said motor, and disabling means controlled by said feedback resistor for deactivating said timing means during flow of a predetermined minimum armature current.

7. A system as defined in claim 3, 4 or 5 wherein said sensing means comprises voltage-divider means connected across said armature winding and electronic holding means with input circuitry connected across part of said voltage-divider means for maintaining one of said branches closed in response to a predetermined voltage drop of one polarity and for maintaining the other of said branches closed in response to a predetermined voltage drop of the opposite polarity.

* * * * *